United States Patent [19]

Taguma

[11] Patent Number: 5,125,287
[45] Date of Patent: Jun. 30, 1992

[54] CYLINDER POWER SHIFTER FOR A GASOLINE OR A DIESEL FUEL INTERNAL COMBUSTION ENGINE

[76] Inventor: Kunito Taguma, 2361 E. Manoa Rd., Honolulu, Hi. 96822

[21] Appl. No.: 564,454

[22] Filed: Aug. 8, 1990

[51] Int. Cl.[5] .................... G05G 1/14; H01H 3/14
[52] U.S. Cl. ........................ 74/560; 74/562; 74/512; 200/61.89
[58] Field of Search ................ 74/560, 512, 513, 514, 74/562; 200/61.89, 61.90

[56] References Cited

U.S. PATENT DOCUMENTS

| | | | |
|---|---|---|---|
| 2,832,863 | 4/1958 | Quimby | 200/61.89 |
| 3,846,599 | 11/1974 | Fontaine | 200/61.89 |
| 4,021,775 | 5/1977 | Leu | 200/61.89 |
| 4,088,852 | 5/1978 | Van Doren | 200/61.89 X |
| 4,115,671 | 9/1978 | Iijima | 200/61.89 X |
| 4,182,198 | 1/1980 | Dartnell | 74/560 X |
| 4,356,471 | 10/1982 | Nienaber | 200/61.89 X |
| 4,793,620 | 12/1988 | Karch | 74/560 X |

FOREIGN PATENT DOCUMENTS

| | | | |
|---|---|---|---|
| 398824 | 8/1923 | Fed. Rep. of Germany | 200/61.90 |
| 617748 | 2/1961 | Italy | 200/61.89 |

*Primary Examiner*—Vinh T. Luong
*Attorney, Agent, or Firm*—Michael I. Kroll

[57] ABSTRACT

The cylinder power shifter for a gasoline or a diesel fuel internal combustion engine includes a substantialy "cubic"-shaped hollow housing mounted to the under surface of the vehicle floor, a linkage connecting the accelerator pedal to the cylinder power shifter, a plurality of stationary posts disposed throughout the cylinder power shifter so that the linkage is properly guided, and a plurality of stationary switches disposed throughout the cylinder power shifter so that the number of engine strokes can be changes from 4 to 2.

5 Claims, 2 Drawing Sheets

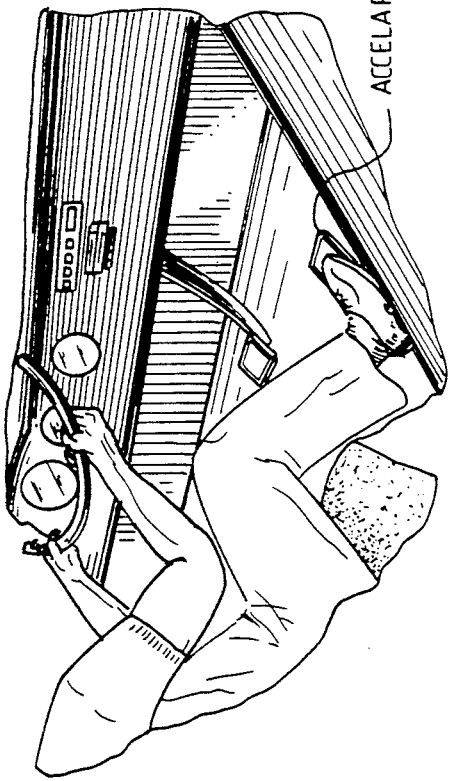
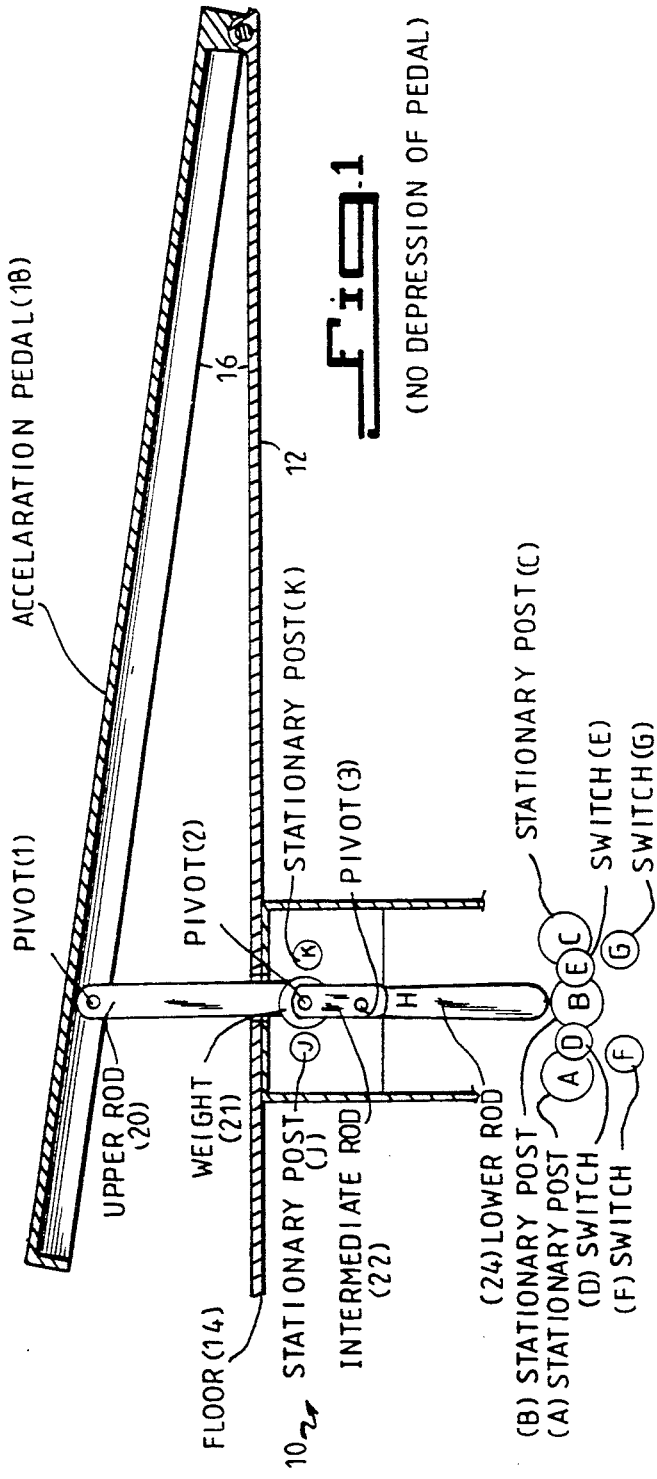

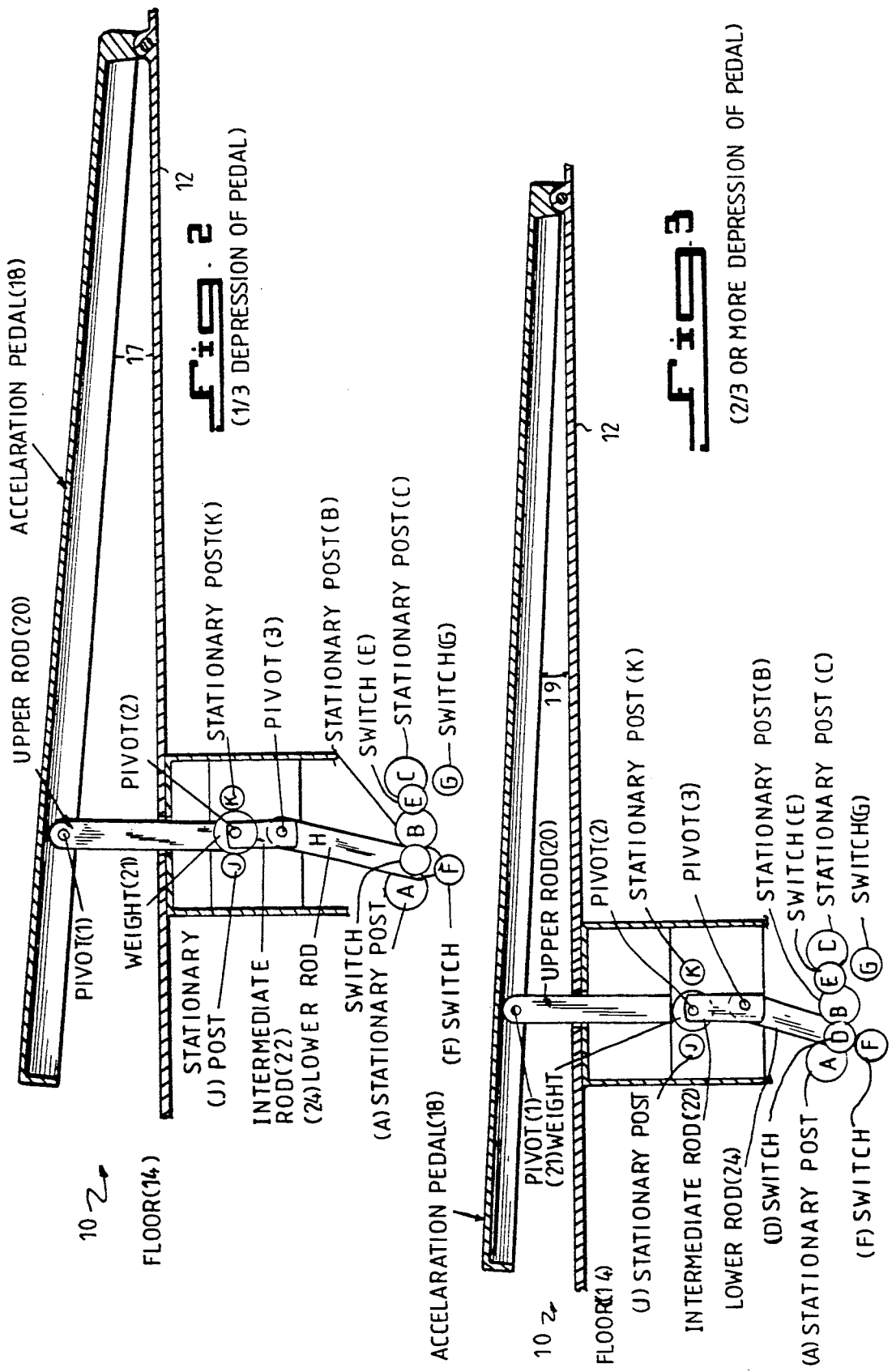

CYLINDER POWER SHIFTER FOR A GASOLINE OR A DIESEL FUEL INTERNAL COMBUSTION ENGINE

BACKGROUND OF THE INVENTION

1. Field of the Invention

The present invention relates to a gasoline or a diesel fuel internal combustion engine.

More particularly, the present invention relates to a cylinder power shifter for a gasoline or a diesel fuel internal combustion engine 2. Description of the Prior Art Numerous innovations for power shifters have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a cylinder power shifter for a gasoline or a diesel fuel internal combustion engine that avoids the disadvantages of the prior art.

More particularly, it is an object of the present invention to provide a cylinder power shifter for a gasoline or a diesel fuel internal combustion engine that uses less fuel and produces less pollution; it fits snugly under the vehicle floor wherein the number of cylinders operating in the internal combustion engine depends upon the position (0, one-third, two-third) of the acceleration pedal that is controlled by the user.

The cylinder power shifter of the present invention permits allows the engine to run as a 4 cycle engine when it is first started and idling. This causes the engine to use less fuel and produce less pollution.

The present invention includes a plurality of stationary posts and a plurality of switches. The stationary posts provide guidance and are designated by J, K, A, B, and C. The switches provide cycle changes and are designated by D, F, E, and G.

In keeping with these objects, and with others which will become apparent hereinafter, one feature of the present invention resides, briefly stated, in a combination of an automatic cylinder power shifter and an accelerator pedal of an internal combustion engine, and having, a substantially "cubic"-shaped hollow housing mounted under the surface of the vehicle floor, a linkage connecting the accelerator pedal to the cylinder power shifter, a plurality of stationary posts disposed throughout the cylinder power shifter so that the linkage is properly guided, wherein a plurality of stationary switches are disposed throughout the cylinder power shifter .

When the cylinder power shifter for a gasoline or a diesel fuel internal combustion engine is designed in accordance with the present invention, the number of engine strokes can be changed from 4 to 2 and thereby save fuel while reducing pollution.

In accordance with another feature of the present invention, the linkage includes an upper rod, a short intermediate rod, and a lower rod.

Another feature of the present invention is that the upper rod forms a first pivot joint with the accelerator pedal, the short intermediate rod forms a second pivot joint with the upper rod, and the lower rod forms a third pivot joint with the short intermediate rod.

Yet another feature of the present invention is that it further comprises a weight disposed at the second pivot joint so that the upper rod remains plumb.

Still another feature of the present invention is that the plurality of stationary posts is five.

Yet still another feature of the present invention is that the plurality of stationary switches is four.

Still yet another feature of the present invention is that when the accelerator pedal is depressed one third, the upper rod is guided by a first stationary post and a second stationary post, and the lower rod is guided by a third stationary post and a fourth stationary post, wherein the lower rod presses down on the first stationary switch which now makes the left side of the engine 2 cycle.

Another feature of the present invention is that when the accelerator pedal is depressed two-thirds, the lower rod further presses down on the second stationary switch which along with the depressed first stationary switch makes the entire engine 2 stroke.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a cross sectional side view of the cylinder power shifter for a gasoline or a diesel fuel internal combustion engine of the present invention wherein the accelerator pedal is not depressed at all.

FIG. 2 is a cross sectional side view of the cylinder power shifter for a gasoline or a diesel fuel internal combustion engine of the present invention wherein the accelerator pedal is depressed one third;

FIG. 3 is a cross sectional side view of the cylinder power shifter for a gasoline or a diesel fuel internal combustion engine of the present invention wherein the accelerator pedal is depressed two thirds; and FIG. 4 is a perspective view of cylinder power shifter for a gasoline or a diesel fuel internal combustion engine of the present invention being used in a vehicle by a user.

DETAILED DESCRIPTION OF THE PREFERRED EMBODIMENT

Referring now to FIG. 1, the cylinder power shifter of the present invention is shown generally at 10 mounted to the under surface 12 of the vehicle floor 14. Above the vehicle floor 14, and in a neutral position 16, is the accelerator pedal 18 which is mounted skew to the floor 14.

As shown in the FIGURES, the cylinder power shifter 10 of the present invention includes a stationary post J, a stationary post K, an upper rod 20, a short intermediate rod 22, a lower rod 24, a pivot joint 1, a pivot joint 2, a weight 21, a pivot joint 3, a stationary post A, a stationary post B, a stationary post C, a D switch D, a second switch F, a third switch E, and a fourth switch G.

In FIG. 2, the accelerator pedal 18 is depressed one-third, and forms an angle 17 with the floor 14. As the upper rod 20 travels down, via the linkage of the short intermediate rod 22 and the weight 21, it gently touches the stationary post B and slides to the side of the stationary post B, via the pivot joints 1 through 3, as its path is guided by the stationary post A(C) and the stationary post B.

As the lower rod 24 moves between the stationary post A(C) and the stationary post B, the lower rod 24 presses switch D(E). The switch D(E) is closed and a signal is sent to the left side of the engine, making the left side of the engine 2 cycle.

In FIG. 3, the accelerator pedal 18 is depressed two thirds and forms an angle 19 with the vehicle floor 14. The upper rod 20 continues to travel down, via the linkage of the short intermediate rod 22, the weight 21, and the pivot joints 1 through 3.

As the lower rod 24 continues to move downward, between the stationary post A(C) and the stationary post B, the lower rod 24 presses switch F(G). The switch F(G) is closed and a signal is sent to the right side of the engine, making the entire engine 2 cycle.

The power shifter 10 of the present invention can also be operated manually, as a backup system. Two switch knobs are mounted on the dashboard of the vehicle. If the left switch knob is pushed in, then the left side of the engine would become 2 cycle. If the right switch knob is pushed in, then the right side of the engine would become 2 cycle. If both the left switch knob and the right switch knob are pushed in, then the entire engine would become 2 cycle.

It will be understood that each of the elements described above, or two or more together, may also find a useful application in other types of constructions differing from the type described above.

While the invention has been illustrated and described as embodied in a power shifter for a gasoline or a diesel fuel internal combustion engine, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In combination an automatic cylinder power shifter and an accelerator pedal of an internal combustion engine operating in a vehicle, comprising:
    a) a substantially "cubic"-shaped hollow housing mounted to the under surface of the vehicle floor;
    b) a linkage connecting the accelerator pedal to the cylinder power shifter, said linkage includes an upper rod, a short intermediate rod, and a lower rod, said upper rod forms a first pivot joint with the accelerator pedal, said short intermediate rod forms a second pivot joint with said upper joint, and said lower rod forms a third pivot joint with said short intermediate rod;
    c) a plurality of stationary posts disposed throughout the cylinder power shifter so that said linkage is properly guided;
    d) a plurality of stationary switches disposed throughout the cylinder power shifter so that the number of engine strokes can be changed from 4 to 2 and thereby save fuel while reducing pollution; and
    e) a weight disposed at said second pivot joint so that said upper rod remains plumb.

2. A power shifter as defined in claim 1, wherein said plurality of stationary posts is five.

3. A power shifter as defined in claim 2, wherein said plurality of stationary switches is four.

4. A power shifter as defined in claim 3, wherein when the accelerator pedal is depressed one third said upper rod is guided by a first stationary post and a second stationary post and said lower rod is guided by a third stationary post and a fourth stationary post, said lower rod presses down on the first stationary switch which now makes the left side of the engine 2 cycle.

5. A power shifter as defined in claim 4, wherein when the accelerator pedal is depressed two-thirds said lower rod further presses down on the second stationary switch F which along with the depressed first stationary switch D makes the entire engine 2 stroke.

* * * * *